(12) United States Patent
Hong et al.

(10) Patent No.: US 9,456,167 B2
(45) Date of Patent: *Sep. 27, 2016

(54) METHOD OF TRANSMITTING AND RECEIVING BROADCAST SIGNAL AND APPARATUS FOR RECEIVING BROADCAST SIGNAL

(75) Inventors: Ho Taek Hong, Seoul (KR); Jong Yeul Suh, Seoul (KR); Joon Hui Lee, Seoul (KR); Jae Hyung Song, Seoul (KR); Jin Pil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 12/591,901

(22) Filed: Dec. 3, 2009

(65) Prior Publication Data

US 2010/0146547 A1    Jun. 10, 2010

Related U.S. Application Data

(63) Continuation of application No. 12/218,074, filed on Jul. 11, 2008, now Pat. No. 8,234,681.

(60) Provisional application No. 60/949,245, filed on Jul. 12, 2007.

(30) Foreign Application Priority Data

Jul. 10, 2008    (KR) .................. 10-2008-0067106

(51) Int. Cl.
*H04N 7/173* (2011.01)
*H04N 5/445* (2011.01)
(Continued)

(52) U.S. Cl.
CPC .......... *H04N 5/44543* (2013.01); *H04H 60/72* (2013.01); *H04N 5/76* (2013.01);
(Continued)

(58) Field of Classification Search
None
See application file for complete search history.

(56) References Cited

U.S. PATENT DOCUMENTS 6,191,782 B1 * 2/2001 Mori ................ H04N 21/44204
725/37
6,240,555 B1 * 5/2001 Shoff et al. .................... 725/51
(Continued)

FOREIGN PATENT DOCUMENTS

EP    1484914 A1    12/2004
EP    1587322 A2    10/2005
(Continued)

OTHER PUBLICATIONS

Advanced Television Systems Committee: "ATSC Standard: Delivery of IP Multicast Sessions over ATSC Data Broadcast", Jan. 31, 2002.

(Continued)

*Primary Examiner* — Brian T Pendleton
*Assistant Examiner* — Dika C. Okeke
(74) *Attorney, Agent, or Firm* — Dentons US LLP

(57) ABSTRACT

Disclosed are a method of transmitting and receiving a broadcast signal and an apparatus for receiving the broadcast signal. In the present invention, first program table information describing a broadcasting stream, and second program table information including additional service identifier information of the multiplexed stream and third program table information describing the additional service data for the multiplexed stream are obtained. The additional service can be provided with the additional service data by using the third program table information.

14 Claims, 17 Drawing Sheets

(51) Int. Cl.

| | | |
|---|---|---|
| H04H 60/72 | (2008.01) | |
| H04N 5/76 | (2006.01) | |
| H04N 21/236 | (2011.01) | |
| H04N 21/2362 | (2011.01) | |
| H04N 21/433 | (2011.01) | |
| H04N 21/434 | (2011.01) | |
| H04N 21/443 | (2011.01) | |
| H04N 21/482 | (2011.01) | |
| H04H 20/30 | (2008.01) | |
| H04H 40/18 | (2008.01) | |
| H04H 60/07 | (2008.01) | |
| H04N 21/422 | (2011.01) | |
| H04N 21/431 | (2011.01) | |
| H04N 21/47 | (2011.01) | |

(52) U.S. Cl.
CPC ... *H04N 21/2362* (2013.01); *H04N 21/23614* (2013.01); *H04N 21/4334* (2013.01); *H04N 21/4348* (2013.01); *H04N 21/4438* (2013.01); *H04N 21/482* (2013.01); *H04N 21/4821* (2013.01); *H04H 20/30* (2013.01); *H04H 40/18* (2013.01); *H04H 60/07* (2013.01); *H04N 21/42204* (2013.01); *H04N 21/4316* (2013.01); *H04N 21/47* (2013.01)

(56) References Cited

U.S. PATENT DOCUMENTS

| | | | |
|---|---|---|---|
| 6,700,624 B2 * | 3/2004 | Yun | 725/40 |
| 6,751,401 B1 * | 6/2004 | Arai et al. | 725/40 |
| 6,795,506 B1 * | 9/2004 | Zhang et al. | 348/390.1 |
| 7,032,236 B1 * | 4/2006 | Ozkan et al. | 725/39 |
| 7,367,043 B2 | 4/2008 | Dudkiewicz et al. | |
| 7,637,043 B2 | 12/2009 | Brown, Jr. et al. | |
| 7,779,448 B2 * | 8/2010 | Kim et al. | 725/151 |
| 7,904,928 B2 * | 3/2011 | Yamaguchi et al. | 725/64 |
| 7,917,926 B2 * | 3/2011 | Corl | 725/39 |
| 7,920,701 B1 | 4/2011 | Cox et al. | |
| 8,234,681 B2 | 7/2012 | Hong et al. | |
| 2001/0006404 A1 * | 7/2001 | Yun | 348/553 |
| 2002/0035726 A1 | 3/2002 | Corl | |
| 2002/0092031 A1 | 7/2002 | Dudkiewicz et al. | |
| 2002/0157099 A1 | 10/2002 | Schrader et al. | |
| 2003/0028879 A1 * | 2/2003 | Gordon et al. | 725/39 |
| 2004/0025181 A1 * | 2/2004 | Addington et al. | 725/58 |
| 2004/0078809 A1 * | 4/2004 | Drazin | 725/46 |
| 2005/0170799 A1 | 8/2005 | Strandberg et al. | |
| 2006/0271552 A1 * | 11/2006 | McChesney | G06Q 30/02 |

FOREIGN PATENT DOCUMENTS

| | | |
|---|---|---|
| EP | 1684517 A2 | 7/2006 |
| JP | 2001-169197 A | 6/2001 |
| KR | 10-2005-0052506 A | 6/2005 |
| KR | 10-2006-0091457 A | 8/2006 |
| KR | 10-2006-0128708 A | 12/2006 |
| KR | 10-2007-0047074 A | 5/2007 |

OTHER PUBLICATIONS

Office Action of the U.S. Patent Office in U.S. Appl. No. 12/591,900, dated Jan. 17, 2014.
U.S. Appl. No. 12/591,900, filed Dec. 3, 2009.
U.S. Appl. No. 13/591,852, filed Aug. 22, 2012.
Summons to attend oral proceedings of the European Patent Office in Appl'n No. 08778735.4, dated Jan. 16, 2012.
Office Action of the U.S. Patent Office in U.S. Appl. No. 12/218,074, dated Jan. 17, 2012.
Office Action of Canadian Patent Office in Appl'n No. 2 692 770, dated May 23, 2012.

* cited by examiner

|  | 21:00 | 21:40 | 22:30 | 23:10 |
|---|---|---|---|---|
| 9-1 Channel (AAA) | AA news | AA drama<br>iDTT | AA news file<br>iDTT | ..... |
| 11-1 Channel (BBB) | BB news | | BB sport | BB drama | ..... |

FIG. 8
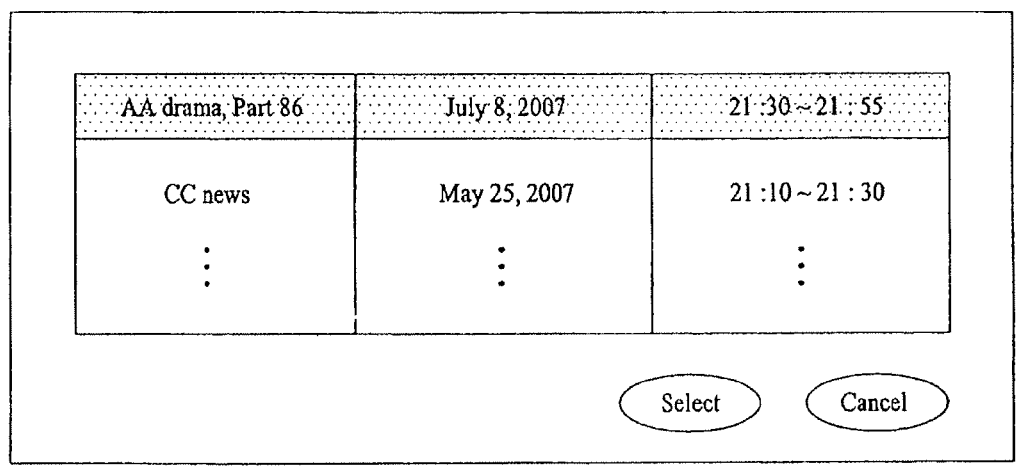
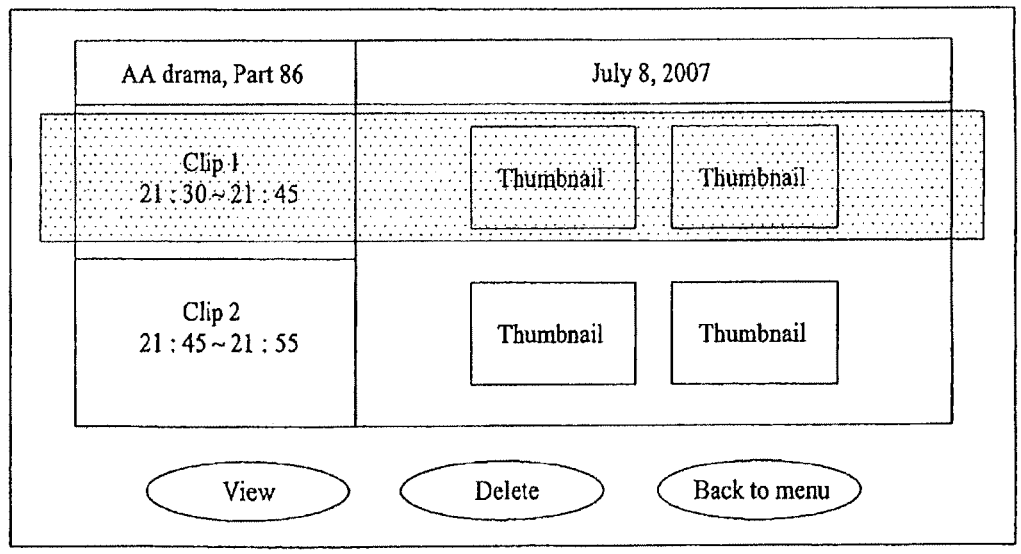

FIG. 13

| Syntax | No. of bits | Format |
|---|---|---|
| iDTT_descriptor() {<br>    descriptor_tag<br>    descriptor_length<br>    source_id<br>} | 8<br>8<br>16 | uimsbf<br>uimsbf<br>uimsbf |

FIG. 14

| Value | Meaning |
|---|---|
| 0x00 | [ Reserved ] |
| 0x01 | Analog_television – The virtual channel carries analog television programming |
| 0x02 | ATSC_digital_television – The virtual channel carries television programming (audio, video and optional data) conforming to ATSC standards. |
| 0x03 | ATSC_audio – The virtual channel carries audio programming (audio service and optional data) conforming to ATSC standards. |
| 0x04 | ATSC_data_only_service – The virtual channel carries a data service conforming to ATSC standards, but no video of stream_type 0x02 or audio of stream_type 0x81. |
| 0x05 | Software Download Data Service – see A/97 |
| 0x06 | Unassociated/small screen service – see A/65C Amendment 1 |
| 0x07 | Parameterized Service – New A/V CODEC |
| 0x08 | iDTT service |
| 0x09-0x7F | [ Reserved for future ] |
| 0x80-0xFF | [ User Private ] |

FIG. 15

| Syntax | No. of bits | Format |
|---|---|---|
| iDTT_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   short_name | 7*16 | uimsbf |
|   num_clips_in_section | 8 | uimsbf |
|   for (i=0; i< num_clips_in_section; i++) { | | |
|     clip_id   ⎫ | 16 | uimsbf |
|     content_type | 8 | uimsbf |
|     moduleID | 16 | uimsbf |
|     clip_description_length | 8 | uimsbf |
|     clip_description()  ⎬ Clip Description Loop | var | |
|     free_DRM_mode | 1 | bslbf |
|     reserved | 5 | '11111' |
|     descriptors_length | 10 | uimsbf |
|     for (i=0; i<N; i++) {  ⎭ | | |
|       descriptor() | var | |
|     } | | |
|   } | | |
|   reserved | 6 | '111111' |
|   additional_descriptors_length | 10 | uimsbf |
|   for (j=0; j<N; j++) { | | |
|     additional_descriptor() | var | |
|   } | | |
|   CRC_32 | 32 | rpchof |
| } | | |

FIG. 16

| Value | Description |
| --- | --- |
| 0x00 | reserved |
| 0x01 | Partial scene of the main event |
| 0x02 | Supplementary video clip – making film |
| 0x03 | Supplementary video clip – music video |
| 0x04 | Supplementary video clip – interview |
| 0xC0 | Data broadcasting |
| 0xD0 | Related contents – O.S.T |

FIG. 17

| Value | Description |
| --- | --- |
| 0x0 | Free content |
| 0x1 | DRM applied content |

FIG. 18

| Syntax | No. of bits | Format |
|---|---|---|
| iDTT_scene_descriptor() { | | |
|   descriptor_tag | 8 | uimsbf |
|   descriptor_length | 8 | uimsbf |
|   source_id | 16 | uimsbf |
|   reserved | 2 | '11' |
|   event_id | 14 | uimsbf |
|   scene_number | 8 | uimsbf |
|   start_time | 32 | uimsbf |
|   reserved | 4 | '1111' |
|   length_in_seconds | 20 | uimsbf |
| } | | |

FIG. 19

| Syntax | No. of bits | Format |
|---|---|---|
| iDTT_purchase_descriptor() { | | |
|   descriptor_tag | 8 | uimsbf |
|   descriptor_length | 8 | uimsbf |
|   license_type | 8 | uimsbf |
|   price | 16 | uimsbf |
|   purchase_url_length | 16 | uimsbf |
|   purchase_url() | | |
| } | var | |

FIG. 20

| Value | Description |
|---|---|
| 0x00 | reserved |
| 0x01 | Number of times allowable for viewing is one |
| 0x02 | Number of times allowable for viewing is two |
| 0x11 | Number of days allowable for viewing is one |
| 0x12 | Number of days allowable for viewing is two |
| 0xF0 | Unlimited |

FIG. 21

| Syntax | No. of bits | Format |
|---|---|---|
| iDTT_service_location_descriptor() {  <br>  descriptor_tag  <br>  descriptor_length  <br>  URL_Length  <br>  For (j=0; j<URL_Length;j++){  <br>    URLByte  <br>  }  <br>} | <br>8<br>8<br>8<br><br> | <br>uimsbf<br>uimsbf<br>uimsbf<br><br>bslbf | ured to decode the first program table information, the second program table information, and the third program table information, a controller configured to obtain additional service identifier information from the second program table information decoded by the program table infor-

METHOD OF TRANSMITTING AND RECEIVING BROADCAST SIGNAL AND APPARATUS FOR RECEIVING BROADCAST SIGNAL

This application is a Continuation of application Ser. No. 12/218,074 filed Jul. 11, 2008, now U.S. Pat. No. 8,234,681 and claims priority to U.S. Provisional Application Ser. No. 60/949,245 filed Jul. 12, 2007 and Korean Patent Application Number 10-2008-0067106 filed in the Republic of Korea on Jul. 10, 2008, and each of the above-identified applications is incorporated by reference herein in its entirety.

BACKGROUND OF THE INVENTION

1. Field of the Invention

The present invention relates to a method of transmitting and receiving a broadcast signal and an apparatus for receiving the broadcast signal.

2. Discussion of the Related Art

A digital television (DTV) can provide various additional services together with video and audio, which are unique functions of a television (TV). An example of the additional services includes an electronic program guide (EPG).

As digital TV technology has been developed and has come into wide use, a variety of additional services may be provided and, particularly, it is considered that the additional services of the digital broadcasting is provided via an internet network in which bi-directional communication is possible, as well as data broadcasting, channel.

SUMMARY OF THE INVENTION

Accordingly, the present invention is directed to a method of transmitting and receiving a broadcast signal and an apparatus for receiving the broadcast signal that substantially obviate one or more problems due to limitations and disadvantages of the related art.

An object of the present invention is to provide a method of transmitting and receiving a broadcast signal and an apparatus for receiving the broadcast signal capable of obtaining an additional service easily.

Another object of the present invention is to provide a method of transmitting and receiving a broadcast signal and an apparatus for receiving the broadcast signal capable of conveniently obtaining information about additional service in connection with receiving a current broadcasting program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a broadcast signal is provided. The method of transmitting a broadcast signal includes generating a broadcasting stream including at least one program, first program table information describing the broadcasting stream, second program table information including additional service identifier information of the broadcasting stream, and third program table information describing an additional service, generating a stream that multiplexes the broadcasting stream, the first program table information, and the second program table information, and transmitting the multiplexed stream, the third program table information and additional service data.

The first program table information may be a virtual channel table (VCT) and the second program table information is an event information table (EIT) or a data event table (DET). The multiplexed stream is transmitted to a first channel, and the third program table information and the additional service data is transmitted to a second channel. The additional service data is a video clip of a scene unit. The third program table information includes at least one of a clip identifier, which is the additional service data, a content type provided as the additional service, and information indicating whether the additional service can be copied.

In another aspect of the present invention, a method of receiving a broadcast signal is provided. The method of receiving a broadcast signal includes demultiplexing a broadcasting stream including at least one program, first program table information describing the broadcasting stream, and second program table information including additional service identifier information of the broadcasting stream, from the broadcasting signal, parsing the broadcasting stream using the first program table information and parsing the additional service identifier information from the second program table information, obtaining third program table information describing the additional service data for the broadcasting stream from the broadcasting signal using the additional service identifier information and parsing the third program table information and obtaining the additional service data from the broadcasting signal.

The broadcasting stream is received from a first channel of the broadcasting signal, and the third program table information and the additional service data are received from a second channel of the broadcasting signal. The third program table information includes at least one of a clip identifier, which is the additional service data, a content type provided as an additional service, and information indicating whether the additional service can be copied. The method may further include displaying the additional service identifier information in program guide information, when the second program information includes the additional service identifier information.

The third program table information includes at least one of a program identifier including a scene provided as the additional service, an event identifier, a scene serial number, a scene start time, and an additional service availability time.

In another aspect of the present invention, an apparatus for receiving a broadcast signal is provided. The apparatus includes a receiver configured to receive the broadcast signal, a demodulator configured to demodulate the broadcast signal, a demultiplexer configured to demultiplex a broadcasting stream including at least one program, first program table information describing the broadcasting stream, second program table information including additional service identifier information of the broadcasting stream, and third program table information describing an additional service of the broadcasting stream, from the broadcast signal, a program table information decoder configured to decode the first program table information, the second program table information, and the third program table information, a controller configured to obtain additional service identifier information from the second program table information decoded by the program table information decoder and to control additional service data obtained by parsing the third program table to be decoded and a decoder configured to decode the additional service data.

In another aspect of the present invention, the method of receiving a broadcast signal may include receiving the broadcasting signal including program table information, obtaining a broadcasting stream including at least one program and additional service identifier information of the program, generating program guide information using the program table information and displaying the program guide information including the additional service identifier information to a user.

In another aspect of the present invention, the method of receiving, a broadcast signal may include receiving the broadcasting signal including at least one program, receiving program guide information from bi-directional communication channel, receiving additional service identifier information of the program from one of the bi-directional communication channel and the broadcasting signal and adding the additional service identifier information to the program guide information and displaying the added program guide information to a user.

In another aspect of the present invention, the method of receiving a broadcast signal may include receiving the broadcasting signal including program table information and at least one program, obtaining program guide information using the program table information, receiving additional service identifier information of the program from the bi-directional communication channel, adding the additional service identifier information to the program guide information and displaying the program guide information including the additional service identifier information to a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram illustrating an additional service list when a user selects a desired additional service according to an exemplary embodiment of the present invention;

FIG. 13 is a table illustrating an additional service descriptor included in an ELT according to an exemplary embodiment of the present invention;

FIG. 14 is a table illustrating an example of a service type value identifying an additional service according to an exemplary embodiment of the present invention;

FIG. 15 is a table illustrating additional service program table information according to an exemplary embodiment of the present invention;

FIG. 16 is a table illustrating a content type value of additional service program table information according to an exemplary embodiment of the present invention;

FIG. 17 is a table illustrating a value of Free_DRM_mode of additional service program information according to an exemplary embodiment of the present invention;

FIG. 18 is a table illustrating a descriptor describing a scene among descriptors included in a clip unit in additional service program table information according to an exemplary embodiment of the present invention;

FIG. 19 is a table illustrating a purchase descriptor included in additional service program table information according to an exemplary embodiment of the present invention;

FIG. 20 is a table illustrating a field value of license_type according to an exemplary embodiment of the present invention;

FIG. 21 is a table illustrating an additional service location descriptor iDTT_service_location_descriptor describing a location of content included in additional service program information according to an exemplary embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a broadcast signal transmitting and receiving method is described which can obtain various additional services for a program contained in a first channel from the first channel or other channels.

A program described below includes digital contents. An additional service for a program includes, a digital content constituting the divided part of a program when the program is divided into a plurality of contents, a digital content indicating a trailer for the program, and a music and video content related to the program. The additional service for the program also includes information which is capable of being transmitted and received over an Internet network in order to obtain information about purchases related to the program. For example, the additional service for the program includes access information about a server connected to the Internet network, security and authentication information for access to the server, and data related to user response information for purchase confirmation by a user. The additional service, however, may serve information regardless of a program currently displayed to a user.

Program table information described hereinbelow indicates information describing a program or a content, for example, information including control information, such as channel multiplexing information, which controls a transmitted and received program and content. For instance, information, such as program specific information (PSI)/program specific information protocol (PSIP), which is transmitted and received in the form of sections may be the program table information.

Figure 1:
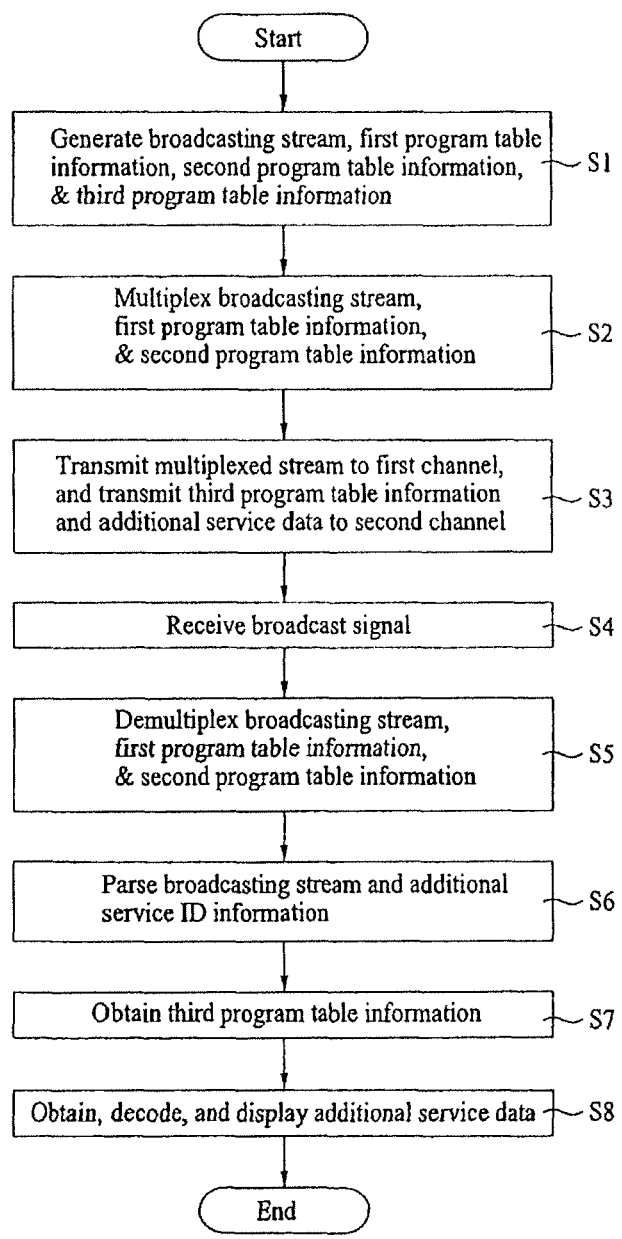
FIG. 1 is a flow chart illustrating a process for transmitting and receiving a broadcast signal according to an exemplary embodiment of the present invention.

FIG. 1 is a flow chart illustrating a process for transmitting and receiving a broadcast signal according to an exemplary embodiment of the present invention.

First, a stream for a program, first program table information describing the program, second program table information including additional service identifier (ID) information of the program, and third program table information describing an additional service of the program are generated (step S1).

The broadcasting stream including programs, the first program table information, and the second program table information are multiplexed (step S2).

The multiplexed stream is transmitted to a first channel, and the third program table information and additional service data are transmitted to a second channel (step S3).

In this embodiments, additional service data and the third program table information describing the additional service data are transmitted a channel different from the channel in which the program is transmitted. But the additional service data and the third program table information may be transmitted in the channel in which the program is transmitted.

A process for receiving the broadcast signal is in reverse order of the above-described process.

The broadcast signal is received (step S4).

The stream, the first program table information describing the program, and the second program table information including the additional service ID information of the program are demultiplexed from the first channel of the broadcast signal (step S5).

The stream for the program is parsed using the first program table information received from the first channel, and the additional service ID information is parsed from the second program table information (step S6).

The third program table information describing the additional service of the program is obtained from the second channel using the additional service ID information (step S7).

The additional service data is obtained from the second channel by parsing the third program table information and is decoded and displayed (step S8).

The additional service may be obtained from the same channel as the channel in which the program is transmitted or the second channel different from as described above or from a network including, a return channel such as the Internet. That is, the third program table information may be transmitted through one channel in which the program is transmitted, or another channel.

A detailed example is described with reference to the accompanying drawings.

Figure 2:
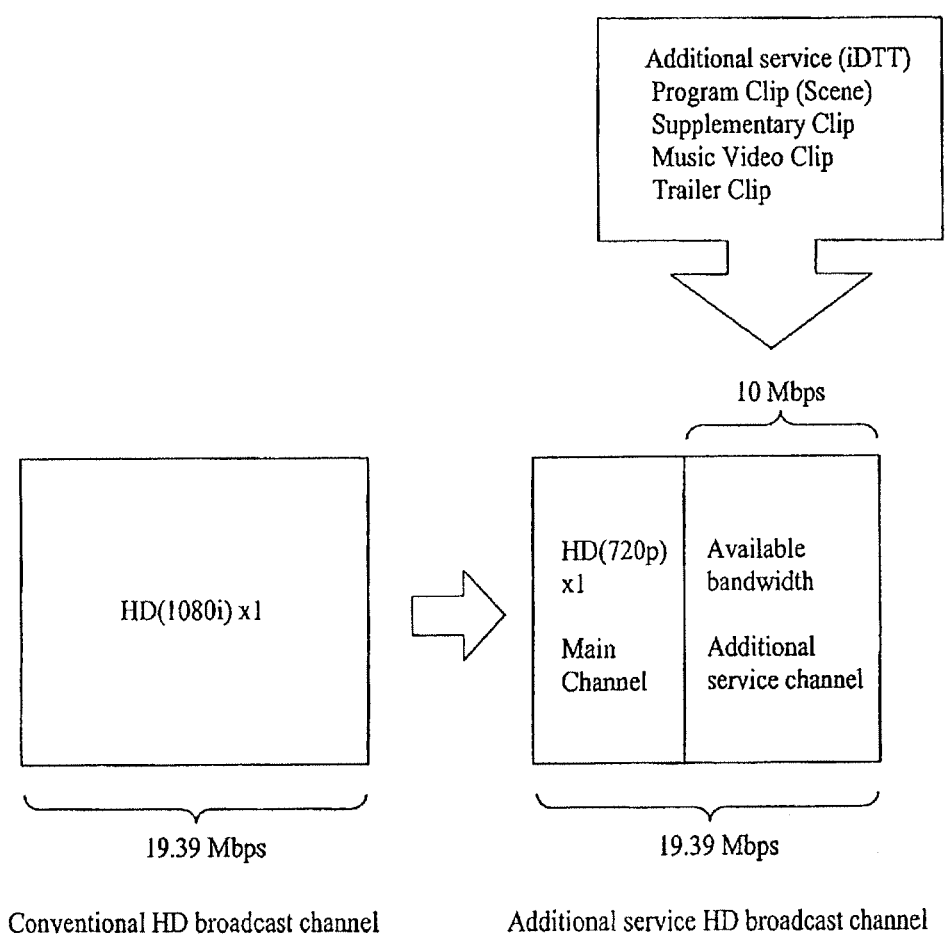
FIG. 2 is a diagram illustrating a channel bandwidth providing an additional service according to an exemplary embodiment of the present invention.

FIG. 2 is a diagram illustrating a channel bandwidth providing an additional service according to an exemplary embodiment of the present invention. It is assumed that 1080i high-definition (HD) video data, a channel bandwidth of which is 19.39 Mbps, is transmitted. As a compression technique and transmission technique have been developed, 720p HD video data, a bandwidth of which is 19.39 Mbps, may be transmitted together with data for providing the additional service. In FIG. 2, a channel through which the 720p HD video data is transmitted is referred to as a main channel, and a channel through which additional service data is transmitted is referred to as an additional service channel. The additional service may include a dividedly transmitted content contained in a program transmitted through the main channel or include a digital content indicating a trailer for the program, and a music and video content related to the program. FIG. 2 illustrates an additional service channel of 10 Mbps and a main channel of 9.39 Mbps.

The divided content may be a video content which is split into one or a few scenes. The divided content can be provided through the additional service channel by request of a user when a user desires to view a content transmitted through the main channel. For example, if a user did not view a program transmitted through the main channel for the first twenty minutes, the user can see a content which is split into scenes through the additional service channel after the program is ended, or the user can simultaneously see a content which has been split through the additional service channel and the program of the main channel in the form of a split-screen.

As another example, a user can receive from the additional service channel a content including a commentary scene of a program producer or outtakes and see the content. As still another example, a user can see through the additional service channel a content including original soundtrack or music video of a program of the main channel, or a content indicating a trailer for the program of the main channel.

Figure 3:
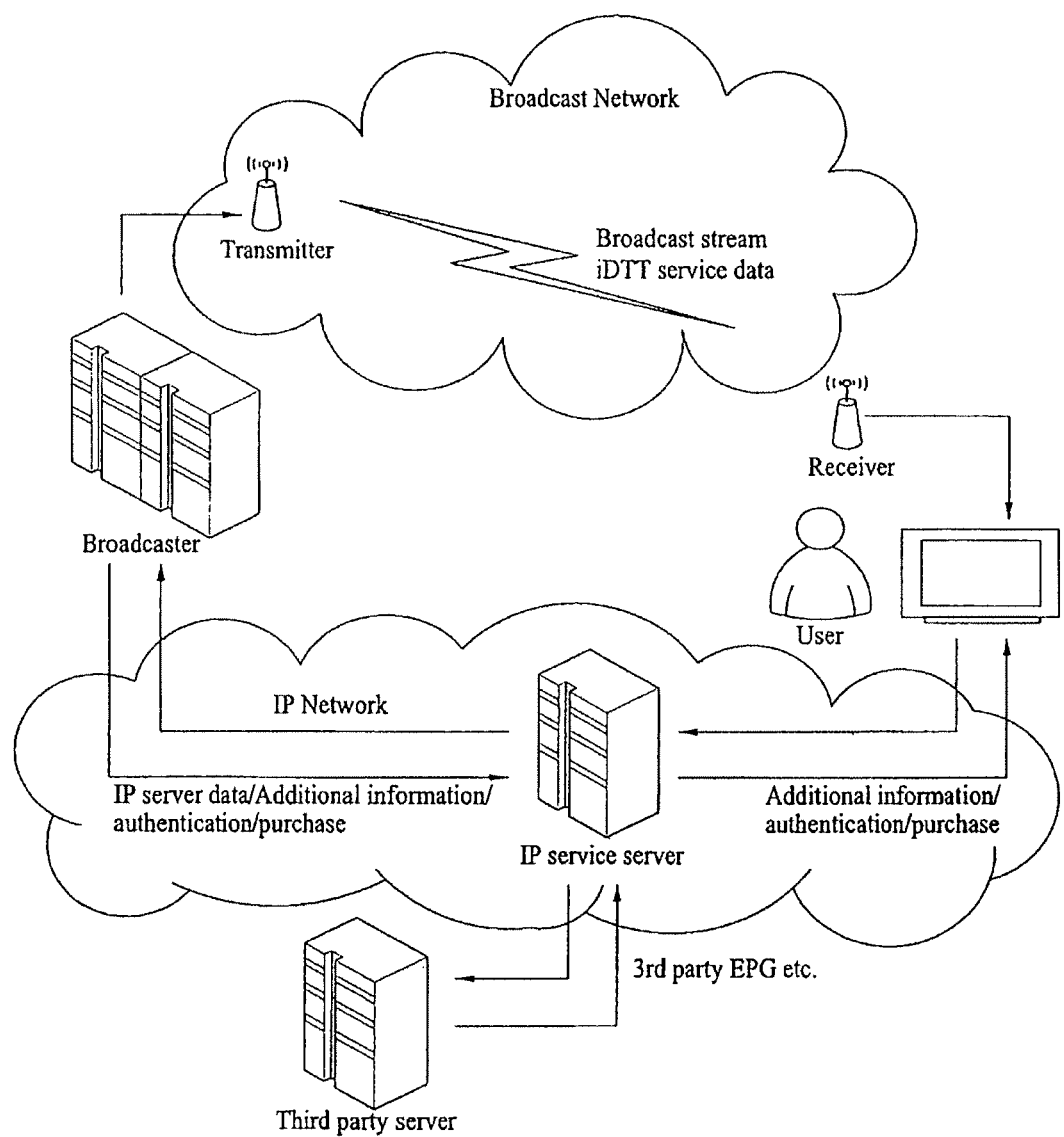
FIG. 3 is a conceptual diagram illustrating an exemplary embodiment for providing an additional service according to the present invention.

FIG. 3 is a conceptual diagram illustrating an exemplary embodiment for providing an additional service according to the present invention. A broadcaster transmits through a transmitter a main content to a main channel and an additional service content to an additional service channel. A receiver receives a broadcast signal transmitted by the broadcaster through a broadcast channel. Meanwhile, the receiver may be connected to a bidirectional communication network such as the Internet. The receiver can transmit to and receive from the broadcaster user authentication information, purchase information, security management information of a digital content, user program participation opinions, user voting opinions, etc. through an IP service server of the Internet network. A third party server connected to the Internet network may transmit information such as an electronic program guide (EPG) to the receiver.

Figures 4, 5:
FIG. 4 is a diagram illustrating an EPG according to an exemplary embodiment of the present invention.
FIG. 5 is a diagram illustrating a screen of a broadcast program according to an exemplary embodiment of the present invention.

FIG. 4 is a diagram illustrating an EPG according to an exemplary embodiment of the present invention. The EPG shows program information of a channel 9-1 transmitted by a broadcaster AAA and program information of a channel 11-1 transmitted by a broadcaster BBB. The EPG may illustrate information indicating that an additional service is included in a program which provides the additional service.

The program guide information may be transmitted via an internet or may be generated from program table information such as EIT and ETT by a broadcasting receiver. The detailed example will be illustrated below. The broadcasting signal receiver receives program guide information and the additional service identifier information, respectively, and provides program guide information to which the additional service identifier information is added as shown FIG. 4.

Additional service identifier information indicating that an additional service is included in a program, may be included in the program table information. The broadcasting signal receiver receives the additional service identifier information and represent the additional service identifier information together with the currently received program.

FIG. 5 is a diagram illustrating a screen of a broadcast program according to an exemplary embodiment of the present invention. A broadcaster and a channel number may be displayed at the upper right side of the screen and an additional service indicator (indicated as 'iDTT') may be displayed at the lower right side of the screen.

Figure 6:
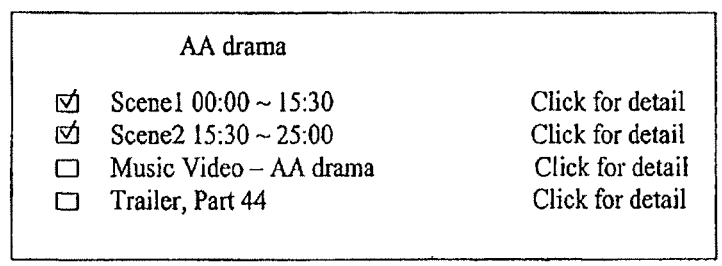
FIG. 6 is a diagram illustrating an additional service list when a user selects additional service providing information displayed on a screen according to an exemplary embodiment of the present invention.

FIG. 6 is a diagram illustrating an additional service list when a user selects additional service providing information displayed on a screen according to an exemplary embodiment of the present invention. If a user selects a corresponding screen or additional service information displayed on the screen using a cursor or a remote controller, an additional service list may be displayed as shown in FIG. 6. In the list, 'AA drama' refers to a title of a program. An additional service includes a split content corresponding to a time period 00:00 to 15:30 based on a first program scene transmitted through a main channel and a split content corresponding to a time period 15:30 to 25:00 based on a second program scene. The additional service may include a music video clip including an original sound track and a trailer clip for a 44th program of a main channel program. Information, for example, 'Click for detail' for providing details of each additional service list item is displayed at the right of each list item. If a user selects a part (represented by ticks) of the additional service list, the user can receive a corresponding additional service through an additional service channel. Icons 'Select all' for selecting all the additional service list items, 'Get selected clips' for obtaining selected clips from the selected additional service list items, and 'Back to TV' for returning back to a main channel program screen are displayed at a lower part of the additional service list. A user selects a desired icon to receive a download service or streaming service corresponding to each icon. If a download service is completed, an indication representing that download has finished may be displayed on a screen.

Figure 7:
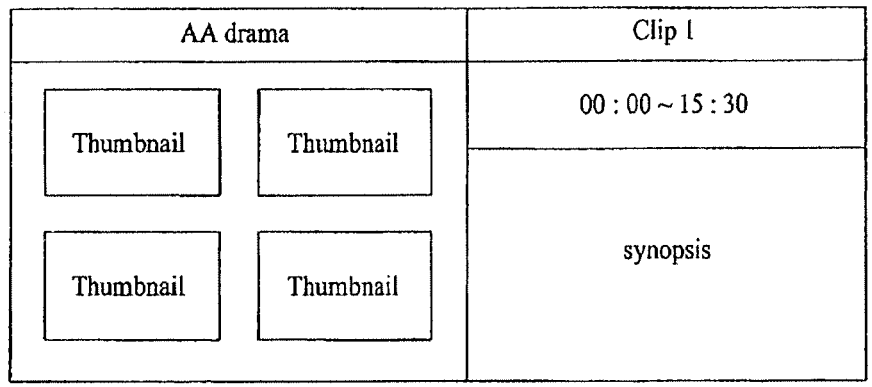
FIG. 7 is a diagram illustrating a screen displayed when information providing details of each clip of an additional service is selected according to an exemplary embodiment of the present invention.

FIG. 7 is a diagram illustrating a screen displayed when information (for example, 'Click for detail') providing details of each clip of an additional service is selected according to an exemplary embodiment of the present invention. Among contents entitled 'AA DRAMA', details of clip 1 corresponding to a time period 00:00 to 15:30 may be displayed. Four representative images for the clip 1 may be displayed in thumbnail form and a synopsis of the clip 1 may be included. Icons 'Select this clip' for selecting a corresponding split content, 'Back to clip lists' for returning to the additional service list, and 'Back to TV' for returning back to a main channel program screen are displayed at a lower part of the screen.

FIG. 8 is a diagram illustrating an additional service list when a user selects a desired additional service according to an exemplary embodiment of the present invention. In FIG. 8, an upper block illustrates an example of storing the additional service list as a clip unit, and a lower block illustrates an example of storing the additional service list as a program unit including a plurality of clips.

In the upper block of FIG. 8, program titles (for example, AA DRAMA (part 86) and CC news), recording dates, and recording times are illustrated. A user selects a desired icon among icons located at a lower side of the block using a remote controller to reproduce a video clip transmitted through the additional service channel. A user may cancel the selected icon using a cancel icon and may return back to a previous screen.

In the lower block of FIG. 8, an example is shown of providing a clip which is a lower unit of a program transmitted through the additional service channel as one program unit. Recording times (21:30 to 21:45, and 21:45 to 21:55) and representative images included in each clip may be displayed in thumbnail form. A user selects a desired clip using icons located at a lower side of the block from the additional service list provided in a program unit, thereby receiving an additional service or returning back to a menu screen.

Figure 9:
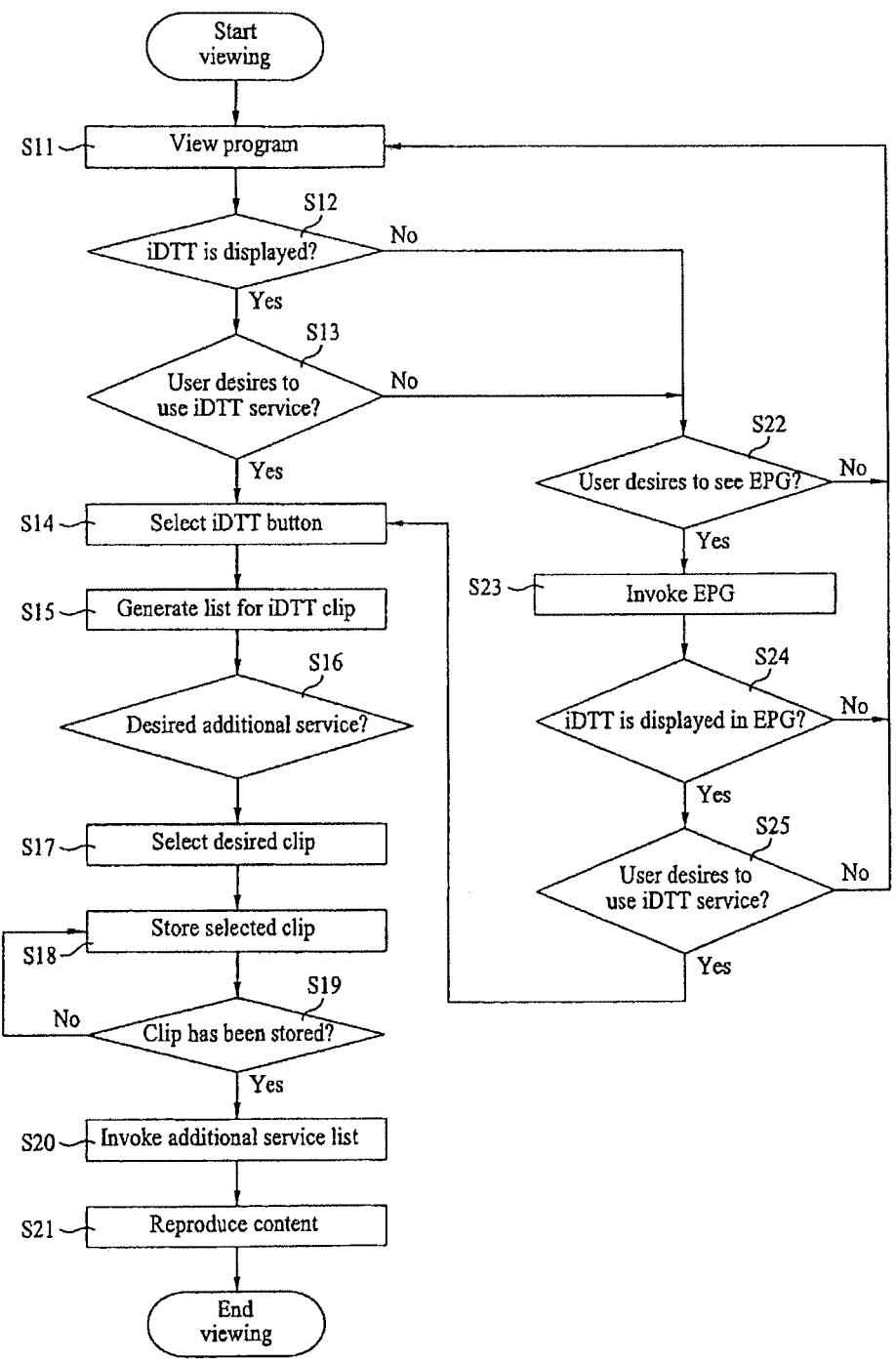
FIG. 9 is a flow chart illustrating an example of using an additional service channel according to an exemplary embodiment of the present invention.

FIG. 9 is a flow chart illustrating an example of using an additional service channel according to an exemplary embodiment of the present invention. While a user views a program transmitted through a main channel (step S11), it is checked whether there is an indication (herein indicated as 'iDTT') of providing an additional service (step S12). If there is an indication 'iDTT', it is determined whether to use an iDTT service (step S13). If a user desires to use the iDTT service, an additional service button is selected (step S14).

A content transmitted through the additional service channel, for example, a list for a program-split video clip is generated (step S15). It is checked if there is a user desired additional service (steps S16). If yes, desired clip is selected (step S17) and the selected clip is stored (step S18). If the video clip for the additional service has been stored (step S19), an additional service list in which additional service content is stored is invoked (step S20). If a specific additional service is selected from the invoked additional service list, a content for the additional service is reproduced simultaneously with or separately from a main channel program (step S21).

If a user desires to see program information like an EPG (step S22), the program information is invoked so as to be displayed on a screen (step S23). If there is an indication 'iDTT' representing that there is an additional service for a specific program (step S24) and if a user desires to use the additional service (step S25), the additional service indication is selected by selecting the iDTT button (step S14).

Hereinafter, a transmitting and receiving system for transmitting and receiving an additional service through an additional service channel is described.

Figure 10:
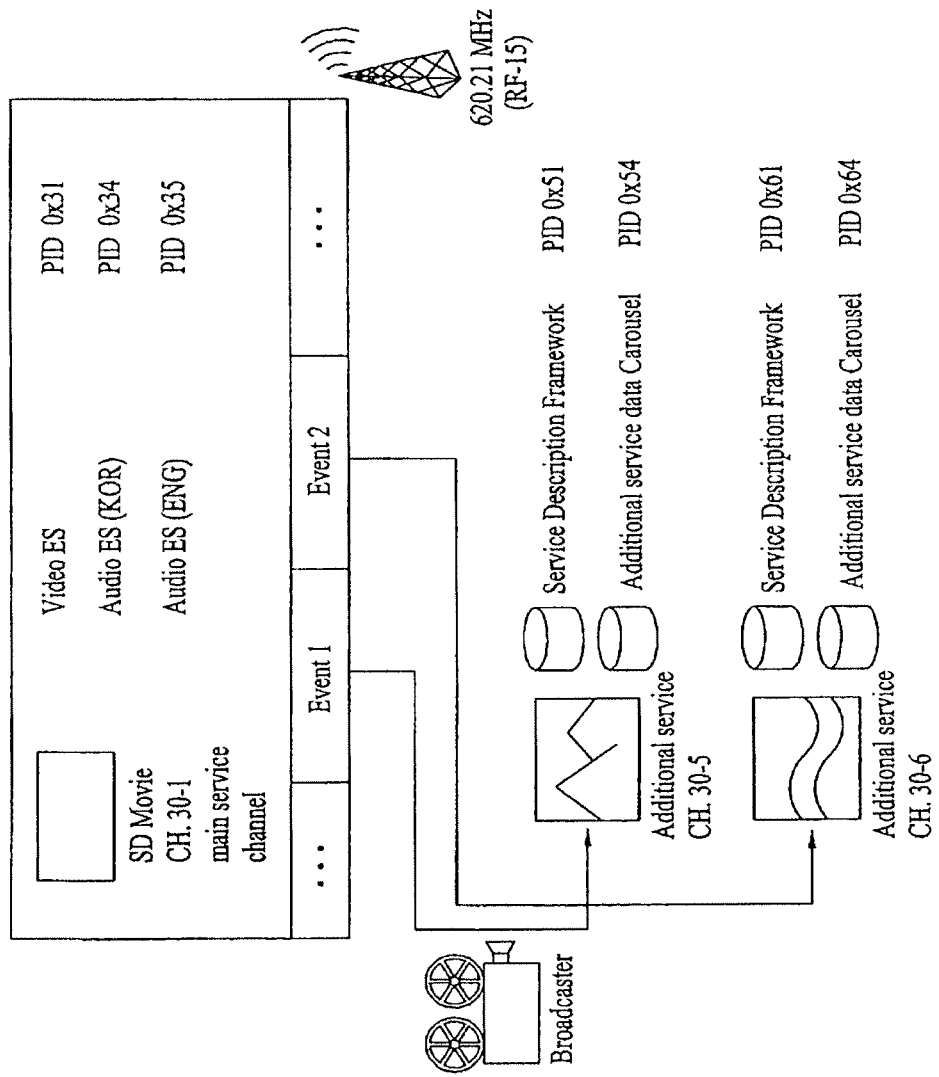
FIG. 10 is a diagram illustrating an example of providing additional service channels according to an exemplary embodiment of the present invention.

FIG. 10 is a diagram illustrating an example of providing additional service channels according to an exemplary embodiment of the present invention.

A broadcaster transmits through a main channel 30-1 a program including a video elementary stream (ES) having a packet identifier (PID) of 0x31, a Korean audio elementary stream having a PID of 0x34, and an English audio elementary stream having a PID of 0x35.

An additional service channel, which provides an additional service, for program information such as each event of the program transmitted through the main service channel, is provided. In an exemplary embodiment, the additional service is transmitted through additional service channels 30-5 and 30-6 which transmit additional service data related to a first event and a second event of the program transmitted though the main channel 30-1.

A service description framework elementary stream having a PID of 0x51 and additional service data carousel having a PID of 0x54 are transmitted through the channel 30-5. A service description framework includes information describing elements of the program.

A service description framework having a PID of 0x61 and additional service data carousel having a PID of 0x64 are transmitted through the channel 30-6.

The three channels may be transmitted on one RF band (in this example, 620.31 MHz) in which the RF number is 15.

Figure 11:
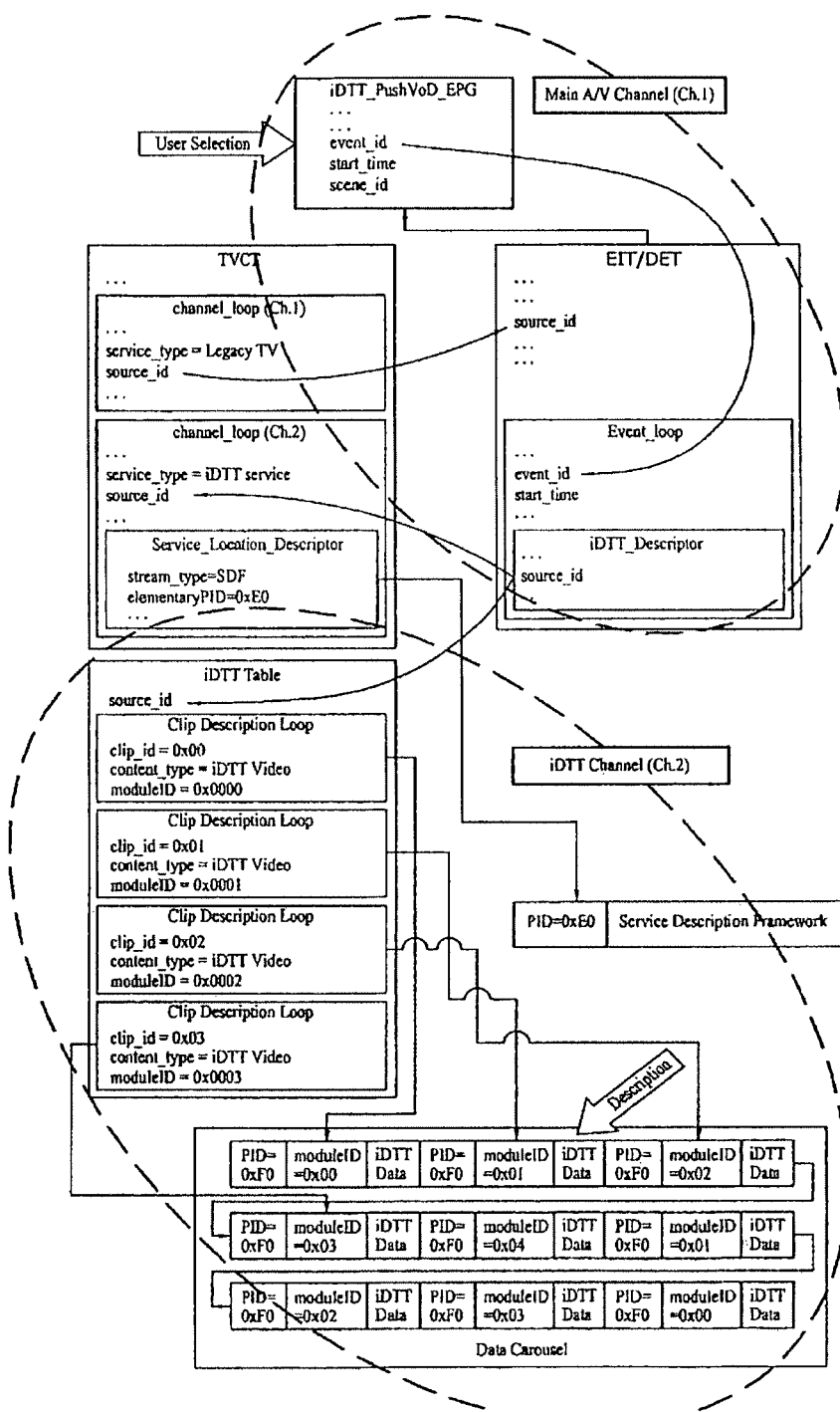
FIG. 11 is a diagram illustrating a process of obtaining additional service data from an additional service channel according to an exemplary embodiment of the present invention.

FIG. 11 is a diagram illustrating a process of obtaining additional service data from an additional service channel according to an exemplary embodiment of the present invention.

Program table information such as a virtual channel table (VCT) or an event information table (EIT), or data event table (DET) which describes a program, is obtained from a broadcast channel. The VCT contains information describing programs of all virtual channels of one physical channel and may describe both a main service channel CH1 and an additional service channel CH2, when the main service data and the mobile service data are transmitted in the CH1 and the CH2, respectively.

The additional service channel may indicate that an additional service is provided by a value of service_type (in this case, indicated as iDTT service) of the channel. A conventional broadcasting receiver, which is not capable of parsing the value of service_type of the additional service channel, can not obtain additional services and receives programs only over the main service channel.

A content can be identified through a source_id field of the VCT. A source ID source_id is obtained from the main service channel CH1 and compared with source_id in the program table information such as the EIT or the DET to identify the content. This example discloses identifier information indicating there is the additional service relating to the event of the current program in the EIT or the DET. Accordingly, this identifier information may be included in any program table information. And, this example illustrated the program table information is the EIT or the DET.

A broadcasting receiver identifies an event of a corresponding program by event_id, which may be data_id in the DET, through event_loop of the EIT or the DET and parses an additional service descriptor iDTT_descriptor indicating whether there is an additional service related to an identified event or content. An additional service content received through an additional service channel CH2 can be identified by source_id of the additional service descriptor iDTT_descriptor. That is, the additional service descriptor may include ID information indicating whether there is an additional service.

Meanwhile, a user can receive an EPG (iDTT_push-VoD_EPG) from a bidirectional network such as the Internet. If the program table information like the EIT or the DET indicates that there is an additional service, an indication representing that a corresponding program includes the additional service may be displayed in the received EPG.

When the broadcasting receiver parses an additional service descriptor iDTT_descriptor, source_id of a content providing an additional service to the additional service channel CH2 can be obtained. Moreover, source_id of the additional service channel is compared with source_id of the additional service descriptor within the EIT or the DET of the main service channel, thereby definitely identifying a content providing an additional service. Further, channel_loop describing the additional service channel of the VCT includes a descriptor Service_Location_Descriptor indicating a location of data providing the additional service. Furthermore, service_type and elementaryPID of the descriptor Service_Location_Descriptor indicate a location of a service description framework (SDF) describing in detail the additional service.

If a user selects the additional service, the broadcasting receiver identifies an additional service content selected from a broadcasting signal with reference to the service description framework and provides the identified content to a user.

The additional service channel may include additional service program table information (iDTT table) which is multiplexed information of the additional service channel. The broadcasting receiver identifies source_id which is the same as source_id within the additional service descriptor in program table information such as the EIT or the DET of the main service channel from additional service channels. Information about a content contained in the additional service is obtained from a clip description describing each additional service content contained in the additional service channel. The broadcasting receiver obtains information about each additional service from the program table information for an additional service and displays the information as an additional service list.

A clip ID clip_id to download a clip, a clip type content_type, and a module ID moduleID within a data carousel when additional service data is transmitted as a data carousel can be identified according to a user request. In FIG. 11, a lower side illustrates a module ID moduleID in which an additional service clip is contained, additional service data (iDTT data), and a service description framework which describe a broadcast stream. In this exemplary embodiment, although the additional service data is transmitted as a data carousel, it is also possible to provide the additional service data by software download or non-real-time service protocol.

Herein, the example illustrates that the additional service identifier information is in a descriptor of EIT or DET. But, this information may be transmitted via bi-directional communication channel. For example, the additional service identifier information may be generated in a XML format, the generated additional service identifier information may be transmitted to a broadcasting signal receiver by the IP stream.

Figure 12:
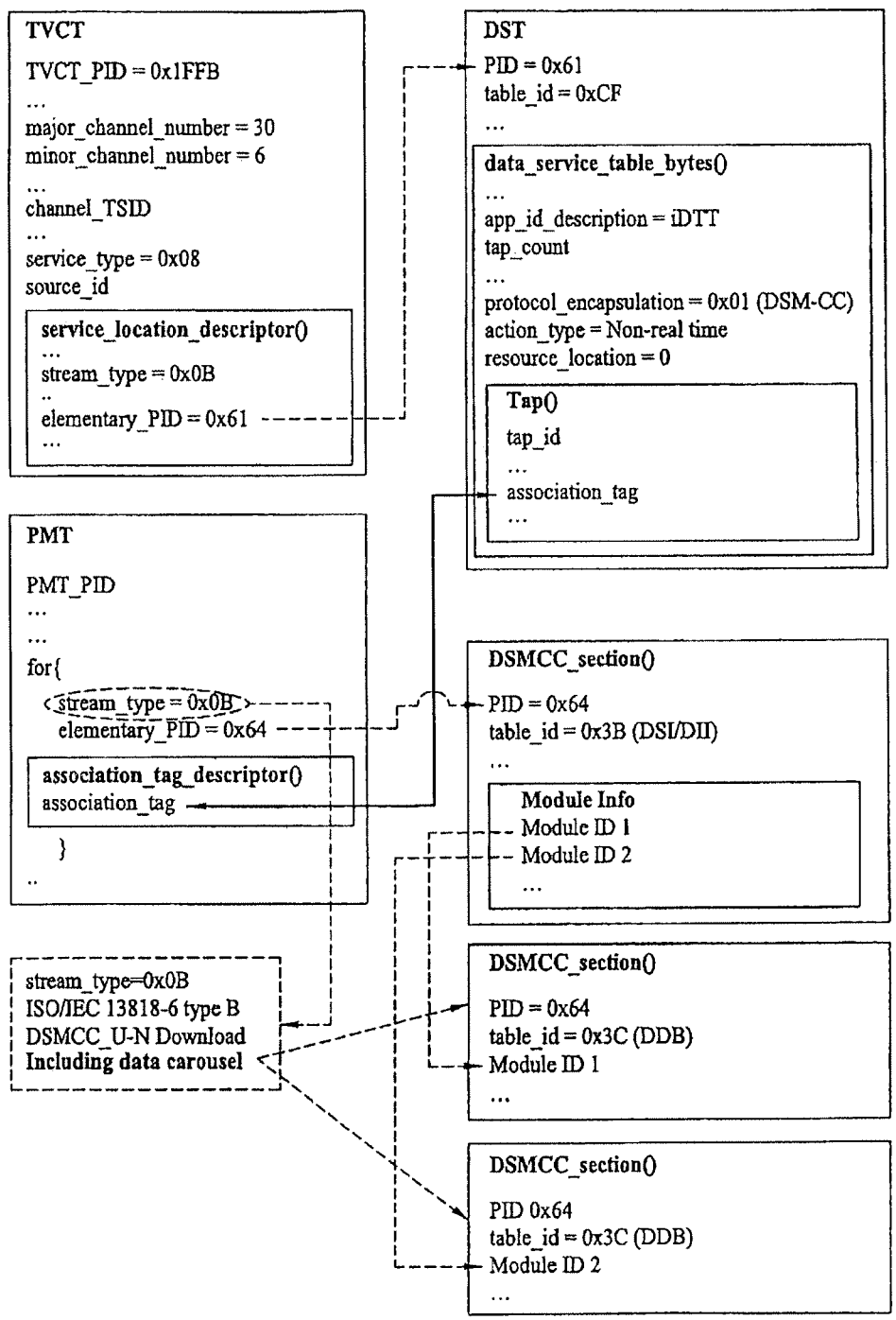
FIG. 12 is a diagram illustrating program table information for obtaining additional service data as a data carousel using a service description framework according to an exemplary embodiment of the present invention.

FIG. 12 is a diagram illustrating program table information for obtaining additional service data as a data carousel using a service description framework according to an exemplary embodiment of the present invention.

Information identifying a virtual channel may be obtained in the TVCT (major_channel_number=30, minor_channel_number=6). A service type service_type may be an identifier (ID) indicating a channel providing an additional service.

A data event table (DST) is obtained by parsing elementary_PID for identifying a packet of the DST within service_location_descriptor. The DST is program table information capable of identifying data used for a data service.

A table ID table_id of the DST is 0xCF and parses information contained in data_service_table_bytes( ) within the DST. In the DST, data_service_table_bytes( ) describes a byte block contained in the DST and app_id_description of data_service_table_bytes( ) describes format and meaning of a subsequent application ID byte. In this exemplary embodiment, app_id_description describes that an additional service is provided (iDTT).

In the DST, tap_count indicates the number of Tap( ) and protocol_encapsulation is a protocol encapsulation type used to transmit a specific data element caused by Tap( ). In this exemplary embodiment, protocol_encapsulation (=0x01) indicates that a data element is a digital storage media-command and control (DSM-CC) section. Moreover, action_type shows a characteristic of data caused by Tap( ). In this exemplary embodiment, action_type indicates non-real time data.

In the DST, association_tag is obtained from Tap( ) within data_service_table_bytes( ) and relates to association_tag within association_tag_descriptor( ) of a program map table (PMT).

In the DST, association_tag within Tap( ) of data_service_table_bytes( ) and association_tag within association_tag_descriptor( ) of the PMT obtain the same stream_type of the PMT. A broadcasting receiver may obtain non-flow controller download or data carousel of which stream_type is 0x0B from a stream loop of the PMT. In this case, DSMCC_section( ) related to association_tag of the PMT may describe the data carousel.

A DSI/DII message (table_id=0x3B) and module information including module ID are included in DSMCC_section( ). An ID of a module including a data block (DDB) is identified from the DSI/DII message and an identified module can be obtained.

FIG. 13 is a diagram illustrating an additional service descriptor included in program table information. The additional service descriptor may include a descriptor tag descriptor_tag, a descriptor length descriptor_length, and a virtual channel ID (source_id) of an additional service. The virtual channel ID of the additional service relates to a virtual channel ID of a VCT. The information illustrated in FIG. 13 may be generated in an XML format, and then transmitted to the broadcasting signal receiver by the IP stream including the XML-formatted information.

FIG. 14 is a table illustrating an example of a service type value identifying an additional service according to an exemplary embodiment of the present invention. For example, a service type value identifying an additional service may be 0x08. If a VCT parses the value 0X08 when parsing information about each virtual channel, information indicating that a corresponding virtual channel provides an additional service may be obtained.

FIG. 15 is a diagram illustrating additional service program table information according to an exemplary embodiment of the present invention. Additional service program table information, which describes an additional service channel, may be included in a channel transmitting an additional service. A description from a table_id field to a protocol_version field conforms to a description of an MPEG-2 TS private section header. In this exemplary embodiment, source_id identifies additional service channel. A brief title of the additional service may be included in a short_name field. The additional service program table information may be transmitted through a stream having a fixed base PID.

In FIG. 15, num_clips_in_section includes information indicating how many clips exist in an additional service channel. A clip_id field is an ID identifying a clip unit. A content_type field is information about a content type and a detailed example thereof will be explained later on. A moduleID field is an ID of a module in which a clip corresponding to a clip ID is transmitted when a clip is transmitted as a data carousel. A clip_description field includes a detailed description of a clip, clip_description_length includes length of clip_description. A free_DRM_mode field indicates whether there is a digital rights management (DRM) and content copy-protection function in a clip. A descriptor loop may include a descriptor describing an additional service scene, additional service purchase, and additional service location information for each additional service clip. An additional_descriptor field may include a descriptor related to the entire channels of the additional service.

FIG. 16 is a table illustrating a content type value of additional service program table information according to an exemplary embodiment of the present invention. For example, if content_type is 0x01, a clip indicates that a content is a split part, that is, a clip is split based on an important event. If content_type is 0x02, a clip indicates a supplementary video clip provided by a content producer. If content_type is 0x03, a clip indicates a music video clip related to the content. If content_type is 0xC0, a clip indicates a data content for data broadcasting related to the content. If content_type is 0xD0, a clip means an original sound track related to the content.

FIG. 17 is a table illustrating a value of Free_DRM_mode of additional service program table information according to an exemplary embodiment of the present invention. The value of 0x0 indicates that a clip content provided as an additional service is a free content, and the value of 0x1 indicates that a copy-protection function is applied to a content.

FIG. 18 is a table illustrating a descriptor describing a scene among descriptors included in a clip unit in additional service program table information according to an exemplary embodiment of the present invention. If a clip is split based on scenes, information describing the respective scenes may be included. A descriptor_tag field is a descriptor ID describing the scene. A source_id field indicates a virtual channel and event_id indicates an event ID. A scene_number field indicates a serial number of scenes included in a content and start_time indicates a time starting a scene. A length_in_second field indicates a time length of a scene.

FIG. 19 is a table illustrating a purchase descriptor included in additional service program table information according to an exemplary embodiment of the present invention. A purchase descriptor is for charge when an additional service is pay per view. A descriptor_tag field is an ID of a purchase descriptor, and license_type shows a license_type value identifying a license type of a paid content. A price field indicates a sale price, and purchase_url( ) indicates an url address.

FIG. 20 is a table illustrating a field value of license_type according to an exemplary embodiment of the present invention. A license type may indicate the number of times and the number of days allowable for viewing in association with content purchases. In FIG. 20, 0x01 indicates that the number of times allowable for viewing is 1, 0x02 indicates that the number of times allowable for viewing is 2, 0x11 indicates that the number of days allowable for viewing is 1, 0x12 indicates that the number of days allowable for viewing is 2, and 0xF0 indicates that the available number of times is unlimited.

FIG. 21 is a table illustrating an additional service location descriptor iDTT_service_location_descriptor describing a location of a content included in additional service, program information. Referring to FIG. 21, descriptor_tag is an ID of a location descriptor for finding a content for an additional service, URLByte indicates URL providing the additional service, and URL_Length indicates the length of an URL byte. The additional service location descriptor may indicate a service address associated with a clip, when a content is within a loop parsing information of clip unit in FIG. 15. Meanwhile, the additional service location descriptor may indicate a service address associated with a program, when a content is at additional_descriptor out of a loop parsing information of clip unit.

Figure 22:
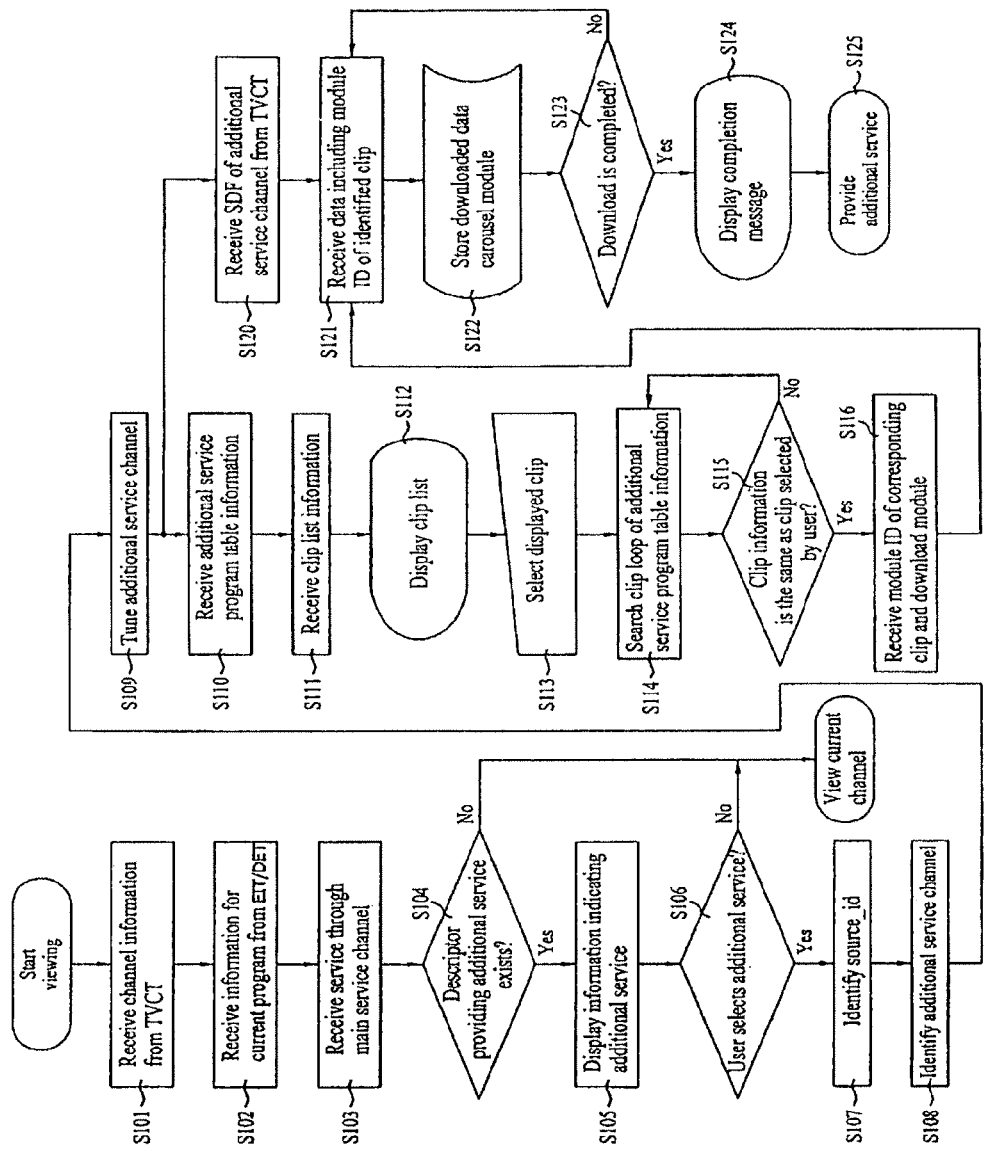
FIG. 22 is a flow chart illustrating an exemplary embodiment for obtaining an additional service from a broadcast signal according to the present invention.

FIG. 22 is a flow chart illustrating an exemplary embodiment for obtaining an additional service from a broadcast signal according to an exemplary embodiment of the present invention.

Channel information is received from a VCT (step S101) and information for a current program which relates to the program event is received from an EIT or DET (step S102). Service is received through a first channel, that is, a main service channel (step S103) and it is checked whether there is a descriptor providing an additional service from the EIT of the first channel (step S104).

If there is an additional service in the first channel, information indicating that the additional service exists on a corresponding program is displayed in an EPG (step S105). The EPG may be received from the Internet or may be generated using event information received through a broadcast channel.

It is checked whether a user selects the additional service (step S106 yes). If a user selects the additional service, source_id for a program providing the additional service is identified from an additional service descriptor of the EIT of the first channel (step S107). An additional service channel is identified from the VCT using the source_id (step S108).

The additional service channel, which is the second channel of the broadcast signal, is tuned (step S109), and additional service program table information describing the additional service is received (step S110).

When the additional service data are provided with the main service data, the additional service program table information may be transmitted through the main channel. In this case, the steps of S107, S108, S109 may not be operated.

Clip list information, which is the additional service, is received from the additional service program table information (step S111) and the clip list is displayed on an on-screen display (OSD) (step S112).

If a user selects the displayed clip (step S113), a clip loop of the additional service program table information is searched (step S114). If clip information is the same as a clip selected by a user (step S115), a module ID of which clip is transmitted is received and the module is downloaded (step S116).

A service description framework of the additional service channel is received from the VCT of the main service channel (step S120). The service description framework describes the additional service. Data including a module ID of the identified clip in step S116 is received from a data carousel (step S121).

If the additional service is provided with the main service in a single channel, service description framework may be transmitted from the main channel. And the additional service data may be transmitted along with module ID of the clip, by which the additional service of the data carousel scheme is provided.

The downloaded data carousel module is stored (step S122). If the download is completed in step S123, a completion message is displayed (step S124) and the additional service is provided (step S125). This embodiment illustrates the program table information as VCT, EIT and DET. Yet, the additional service identifier information may be included in any program table information, may be transmitted by the IP stream through a bi-directional communication channel.

Figure 23:
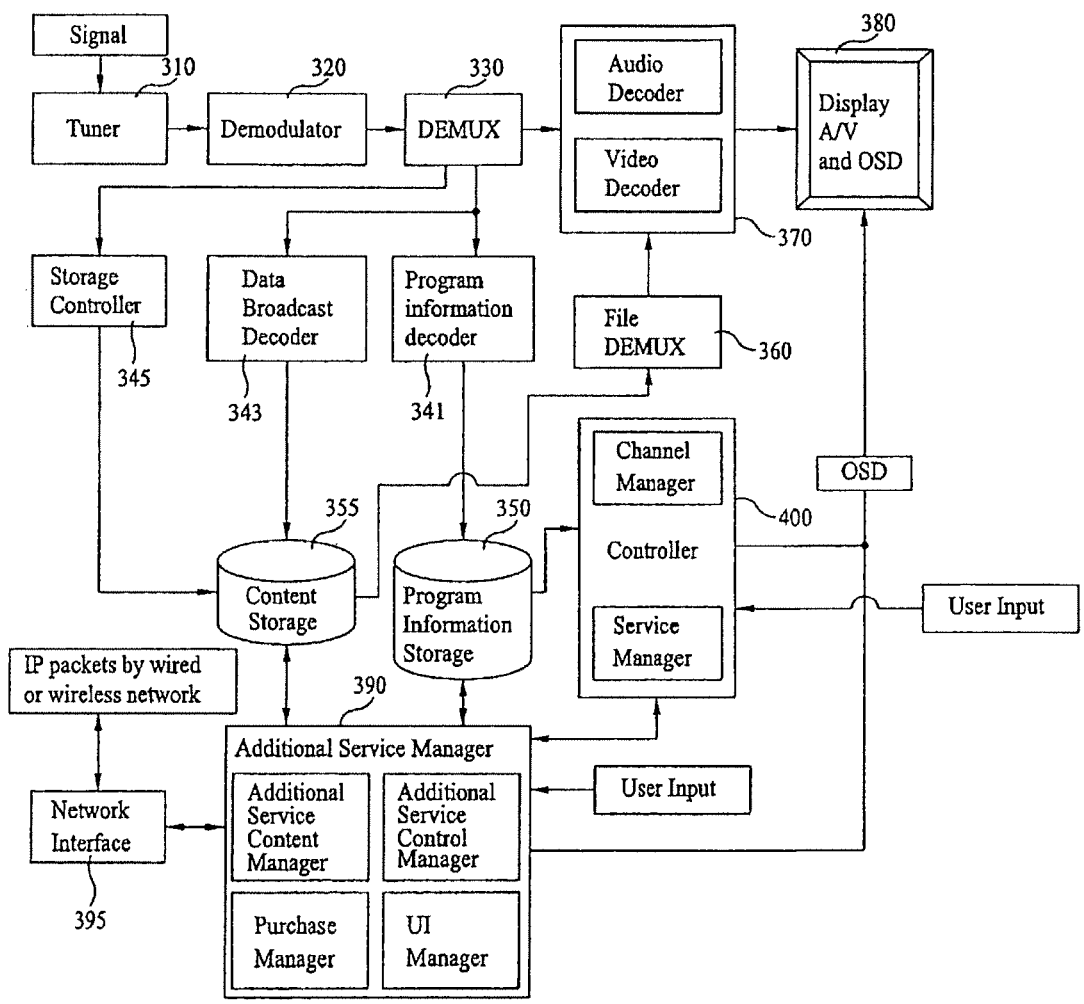
FIG. 23 is a block diagram of a broadcast signal receiving apparatus according to an exemplary embodiment of the present invention.

FIG. 23 is a block diagram of a broadcast signal receiving apparatus according to an exemplary embodiment of the present invention. The broadcast signal receiving apparatus includes a tuner 310, a demodulator 320, a demultiplexer (DEMUX) 330, a program table information decoder 341, a data broadcasting decoder 343, a program table information storage 350, a storage controller 351, a content storage 355, a file demultiplexer 360, a decoder 370, a display 380, an additional service manager 390, a network interface 395, and a controller 400.

The tuner 310 receives a broadcast signal. The broadcast signal received from the tuner 310 may include a main service channel and an additional service channel.

The demodulator 320 demodulates the broadcast signal generated from the tuner 310. For example, the demodulator 320 demodulates a modulation signal of 64 VSB/256 VSB or of 64 QAM/256 QAM.

The demultiplexer 330 demultiplexes a signal generated from the demodulator 320. The demultiplexer 330 transmits a broadcast stream necessary for a current broadcast signal to the decoder 370 and transmits a broadcast stream to be stored to the storage controller 345. The demultiplexer 330 transmits program table information to the program table information decoder 341 and outputs a broadcast signal for data broadcast to the data broadcast decoder 343.

The program table information storage 350 stores program table information decoded by the program table information decoder 341.

The content storage 355 stores a content included in the broadcast signal according, to the control of the storage controller 345. The storage controller 345 reads and outputs data stored in the content storage 355. The content storage 355 stores broadcast data decoded by the data broadcast decoder 343 or stores a content stored according an operation of the additional service manager 390.

The file demultiplexer 360 transmits a file stored in the content storage 355 to the decoder 370.

The decoder 370 decodes a file including a real-time broadcast stream, and a broadcast stream, a clip and a content stored by the content storage 355. The decoder 370 may include a video decoder for decoding a video signal and an audio decoder for decoding an audio signal.

The display 380 displays the video signal decoded by the decoder 370 or outputs the audio signal. The display 380 displays graphics generated by the controller 400 on a display screen.

The additional service manager 390 performs operations related to list display, service output, purchases, and authentication for the additional service contained in the broadcast signal. The detailed description of the additional service manager 390 will be given later.

The additional service manager 390 receives the additional service identifier information via an Internet, and store the additional service identifier information to program table information storage 350. Using the additional service identifier information and the additional service identifier information, the controller 400 controls the program guide information to be displayed to a user. The additional service manager 390 adds the additional service identifier information to the program guide information received from the internet, and controls the program guide information including additional service identifier information to be displayed to the user.

The network interface 395 is connected to an external network so that bidirectional communication is possible by connection with the Internet. Schedule or event information such as the EPG is received via the network interface 395 connected with an Internet and then stored in the content storage unit 355.

The controller 400 controls blocks for receiving user signals related to channel conversion, service provision, and additional service selection. The controller 400 may drive various applications necessary for the broadcast signal receiving apparatus. For example, the controller 400 may drive a channel manager for performing a function related to channel selection and conversion and a service manager for performing a function related to service selection and service provision. The controller 400 may control the additional service manager 390. That is, the controller 400 may drive and control an additional service content control manager, an additional service control manager, a purchase manager, and a user interface (UI) manager of the additional service manager 390.

The controller 400 generates and stores a channel map using program related information which is decoded by the program table information decoder 341 or stored by the program table information storage 350. The channel manager of the controller 400 performs channel conversion with reference to the channel map according to channel selection of a user and updates channel map information. The service manager of the controller 400 controls the additional service manager 390 so that an additional service selected by a user can be provided.

The controller 400 may drive graphical user interface (GUI) displaying a menu related to the additional service on an OSD.

The broadcast signal is received from the first channel. The program table information decoder 341 decodes program table information such as a VCT, an EIT, a DET and so on. If an EPG is received through the network interface 395 or the EIT and ETT of which the EPG is made, is received through the tuner 310, the EPG may be stored in the content storage 355 or the program table information storage 350.

After the VCT is decoded, a broadcast program of the first channel is displayed according to the user's selection or the set-up of the broadcasting signal receiver. If the program table information decoder 341 decodes an additional service descriptor from the EIT or the DET of the first channel, the controller 400 displays an indicator indicating that there is an additional service on the display 380. A user can obtain information indicating that the additional service exists from the EPG through a broadcast screen or a speaker.

Upon receipt of a command selecting the additional service from a user, the controller 400 can obtain information about a second channel through which the additional service is transmitted by confirming source_id of the EIT or the DET, and source_id of the VCT. The controller 400 obtains location information of a service description framework describing the additional service out of the broadcast signal from the VCT.

If the program table information decoder 341 decodes the additional service program table information received from the second channel, the additional service manager 390 obtains from the program table information decoder 341 a content ID contained in the additional service and a module ID of a data carousel in which the content is contained. The controller 400 controls the data broadcasting decoder 343 to receives a module transmitted according to a data carousel format with reference to the decoded service description framework. Data transmitted in the data carousel format is decoded by the data broadcast decoder 343 and stored in the content storage 355.

The controller 400 (or additional application manager 390) controls the data stored in the content storage 355 (the group of this data may be a content file provided as an additional service, such as the illustrated video clip) to be presented in the display unit 380 by the file demultiplexer 360.

The additional service program information and the additional service data may be transmitted in the first channel. In this case, the program table information decoder 341 decodes the additional service program information received from the first channel, and the data broadcasting decoder 343 can decode the received additional service data demultiplexed from the first channel.

In this embodiment, other program table information may be used instead of the illustrated VCT, EIT and DET. At that time, for example, the descriptor including the additional service identifier information may be included in the other program table information.

The additional application manager 390 manages the additional service to the user by using the program table information decoded by the program table information decoder 341. The additional application manager 390 manages that the display unit 380 displays an indication representing that an additional service can be served on the EPG received through the network interface (395). The additional application manager 390 can control that the indication is displayed on the program being displayed, and the additional service list is provided to the user when the user wants the list. The additional application manager 390 can provide the user with content information in a scene unit for additional service, purchase information related to the displayed content, and location information at which the additional service can be obtained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a non real time service in a digital broadcast receiver via a terrestrial broadcast network, the method comprising:

receiving, by a tuner, a broadcast signal including a main channel and an additional channel from the terrestrial broadcast network, wherein a main broadcast service is carried in real time in the main channel and a non-real time service is carried in non-real time in the additional channel;

decoding, a first information received in real time from the broadcast signal via the terrestrial broadcast network, wherein the first information announces the sub-broadcast channel associated with a service type identifier to signify the non real time service;

decoding, a second information received in real time from the broadcast signal via the terrestrial broadcast network, wherein the second information identifies a stream type for data sections for delivering the non-real time service and includes a packet identifier for identifying MPEG-2 TS packets carrying the data sections for delivering the non-real time service, wherein the second information includes a descriptor containing an identifier of the non-real time service carried in the MPEG-2 TS packets with the same packet identifier and the data sections are referenced by the packet identifier;

decoding, a third information that is accessed within the additional channel based on the second information included in the main channel, wherein the third information includes signaling data for the non-real time service, the signaling data being separate from the first information and the second information, the signaling data describing content items available for download to storage in the digital broadcast receiver and wherein the non-real time service is associated with one or more content items, each of which consists of one or more files, the files include a collection of audio or video clips;

wherein the signaling data includes information on time during which the content items are to be made available for download and information for identifying content items, and wherein the signaling data further includes security information indicating that content protection is applied to at least one file that constitutes the non-real time service, wherein the third information includes subscription period information specifying a subscription period for the content items when the content items are purchased, length information specifying a duration of playback of the content item, and location information specifying a location of the content item when the content item is available to be retrieved via an internet;

receiving and storing, from the broadcast signal via the terrestrial broadcast network, non-real time service data based on the third information;

decoding the stored non-real time service data; and providing the decoded non-real time service.

2. The method of claim 1, wherein the third information includes location information of the non real time service.

3. The method of claim 1, wherein when the non real time service is received from the sub-broadcast channel, the non real time service is transmitted using DSM-CC section.

4. The method of claim 1, further comprising:
providing information indicating whether or not the non real time service exists.

5. The method of claim 4, wherein when the non real time service is received, an icon for the non real time service is provided on a screen.

6. The method of claim 4, wherein the non real time service is associated with a current program in the main broadcast channel.

7. The method of claim 1, wherein the third information includes identification information whether the non real time service is visible to a user.

8. The method of claim 1, wherein the third information includes information about the storage capability.

9. A digital broadcast receiver for receiving a non real time service via a terrestrial broadcast network, the digital broadcast receiver comprising:
a tuner configured to
receive a broadcast signal including a main channel and an additional channel from the terrestrial broadcast network, wherein a main broadcast service is carried in real time in the main channel and a non-real time service is carried in non-real time in the additional channel;

receive, a first information received in real time from the broadcast signal via the terrestrial broadcast network, wherein the first information announces a channel associated with a service type identifier to signify the non real time service, receive, a second information received in real time from the broadcast signal via the terrestrial broadcast network, wherein the second information identifies a stream type for data sections for delivering the non-real time service and includes a packet identifier for identifying MPEG-2 TS packets carrying the data sections for delivering the non-real time service and, wherein the second information includes a descriptor containing an identifier of the non-real time service carried in the MPEG-2 TS packets with the same packet identifier and the data sections are referenced by the packet identifier, and receive, a third information is accessed within the additional channel based on the second information included in the main channel, wherein the third information includes signaling data for the non-real time service, the signaling data being separate from the first information and the second information, wherein the signaling data describes content items available for download to storage in the digital broadcast receiver and wherein the non-real time service is associated with one or more content items, each of which consists of one or more files, the files include a collection of audio or video clips, wherein the signaling data includes information on time during which the content items are to be made available for download and information for identifying content items, and wherein the signaling data further includes security information indicating that content protection is applied to at least one file that constitutes the non-real time service, wherein the third information includes subscription period information specifying a subscription period for the content items when the content items are purchased, length information specifying a duration of playback of the content item, and location information specifying a location of the content item when the content item is available to be retrieved via an internet;

receive, from the broadcast signal via the terrestrial broadcast network, non-real time service data based on the third information;

a first decoder configured to decode the first information, the second information, and the third information;

a storage configured to store the non-real time service data based on the third information; and a second decoder configured to decode the stored non-real time service data.

10. The digital broadcast receiver of claim 9, wherein the third information includes location information of the non real time service.

11. The digital broadcast receiver of claim 9, the digital broadcast receiver further comprising:
a service manager for providing information indicating whether or not the non real time service exists.

12. The digital broadcast receiver of claim 11, wherein when the non real time service is received, the service manager control to display an icon for the non real time service on a screen.

13. The digital broadcast receiver of claim 9, wherein the non real time service is associated with a current program in the main channel.

14. The digital broadcast receiver of claim 9, wherein the third information includes identification information whether the non real time service is visible to a user.

\* \* \* \* \*